(12) United States Patent
Leonardus Hermsen et al.

(10) Patent No.: US 6,364,406 B1
(45) Date of Patent: Apr. 2, 2002

(54) OPEN ROOF CONSTRUCTION FOR A VEHICLE

(75) Inventors: Erwin Jacobus Christian Leonardus Hermsen, At Venray; Alphonsus Theodorus Bernardus Rooijakkers, Bv Nijmegen; Peter Christiaan Leonardus Johannes Manders, Sm Horst; Martinus Wilhelmus Maria Nabuurs, Jt Overloon, all of (NL)

(73) Assignee: Inalfa Industries B.V. (NL)

( * ) Notice: Subject to any disclaimer, the term of this patent is extended or adjusted under 35 U.S.C. 154(b) by 0 days.

(21) Appl. No.: 09/674,125

(22) PCT Filed: Apr. 22, 1999

(86) PCT No.: PCT/NL99/00233

§ 371 Date: Oct. 26, 2000

§ 102(e) Date: Oct. 26, 2000

(87) PCT Pub. No.: WO99/55546

PCT Pub. Date: Nov. 4, 1999

(51) Int. Cl.⁷ .................................................. B60J 7/00
(52) U.S. Cl. ....................................... 296/214; 296/223
(58) Field of Search ................................. 296/214, 223, 296/224, 216.06–216.08

(56) References Cited

U.S. PATENT DOCUMENTS 3,558,183 A  1/1971 Sigmund
4,890,880 A * 1/1990 Sakamoto .................... 296/214
4,936,623 A * 6/1990 Huyer ......................... 296/214
5,906,412 A  5/1999 Matsumura .................. 296/223

FOREIGN PATENT DOCUMENTS

| DE | 2234852 A |   | 1/1974 |   |
|---|---|---|---|---|
| EP | 0 338 614 A |   | 10/1989 |   |
| EP | 0 802 077 A |   | 10/1997 |   |
| JP | 38126 | * | 3/1984 | ............... 296/223 |
| JP | 359202935 | * | 11/1984 | ............... 296/214 |
| JP | 246824 | * | 10/1990 | ............... 296/214 |
| JP | 10166866 |   | 6/1998 |   |

* cited by examiner

*Primary Examiner*—Dennis H. Pedder
(74) *Attorney, Agent, or Firm*—Westman, Champlin & Kelly, P.A.; S. Koehler

(57) ABSTRACT

An open roof construction for a vehicle having an opening in the fixed roof comprises a frame to be fixed to the roof and an adjustable panel supported by the frame and being adjustable between a closed position closing the roof opening and an open position in which it releases the roof opening on the front side. There is provided a sun screen slidably guided with its side edges within guide groves in guide rails, which are open in a direction to the sun screen. This guiding is effected by means of sliding shoes which are biased outwardly with respect to the sun screen by means of spring members. Two sliding shoes on both sides of a fixing point to the sun screen are connected to the sun screen and are pre-tensioned by a respective spring member. There are provided means for loading the spring members in vertical direction, symmetrically with respect to the fixing point.

19 Claims, 7 Drawing Sheets

OPEN ROOF CONSTRUCTION FOR A VEHICLE

This application claims priority of International application PCT/NL99/00233, filed Apr. 22, 1999 and published in English, the contents of which is hereby incorporated by reference in its entirety.

BACKGROUND OF THE INVENTION

The invention relates to an open roof construction with lower closing elements such as sun screens.

Such an open roof construction is for example known from EP-B-0 338 614. In this prior art open roof construction a sliding shoe is slidably guided on the lower closing element, in this case a sun screen. The sliding shoe is spring-loaded both in an outward direction and in a direction perpendicularly to the lower closing element. Although this construction ensures that the suspension of the lower closing element is to a large extent rattle-free, rattling may nevertheless develop when play occurs in the vertical direction of the guide groove.

The object of the present invention is to provide an improved open roof construction in regards to this point.

SUMMARY OF THE INVENTION

In order to accomplish that objective, the open roof construction according to the invention, in a first embodiment thereof, includes two sliding shoes that are connected to the lower closing element on both sides of a fixing point to said lower closing element the sliding shoes are each biased by an associated spring member, while means are provided by which said spring members are loaded in a vertical direction from said fixing point.

Any play in the vertical direction of the guide groove is thus eliminated. The two spring members are so loaded with respect to the fixing point that hardly any forces will be exerted on the lower closing element, if at all.

In a first embodiment of the invention, the open roof construction means for loading the sliding shoes in the vertical direction are provided with an element provided at the fixing point, by means of which said spring members are loaded in vertical direction.

In a practical embodiment, two sliding shoes are combined in one unit, while the mounting element is fixed to the lower closing element, wherein the element for loading the spring members consists of an auxiliary sliding shoe, which is formed on the mounting element, on a side remote from the lower closing element where the spring members abut, and which is capable of engaging in the associated guide groove, while the sliding shoes are movable in the vertical direction with respect to said auxiliary sliding shoe.

It is very advantageous thereby if the sliding shoes are connected to said auxiliary sliding shoe via a flexible connecting element, while the spring members slidably engage said sliding shoes, at a least in a longitudinal direction, wherein said connecting element, which is pressure-rigid, at least substantially extends in the longitudinal direction in the mounted position of the closing element.

In this manner, the spring loading function of the spring members of the sliding shoes is separated from the connecting function, which is performed by connecting elements in this embodiment. Said connecting elements extend at least approximately in the direction of movement of the sliding shoes, and as a result exert a pushing force in the direction of movement on the respective leading sliding shoes. Said longitudinally extending connection furthermore ensures that compression of the sliding shoe will cause hardly any movement of the sliding shoe in the longitudinal direction with respect to the closing element. As a result, slanting of the closing element and of the leading sliding shoes will have less influence on the amount of friction of the sliding shoes in the guide rail grooves, thus ensuring a more constant resistance against movement of the closing element. This leads to greater evenness of movement of the closing element. In an alternative embodiment, said means may be accommodated in the spring members, in such a manner that the sliding shoes can pivot against a spring force from the spring members about a transverse axis of the open roof construction, while the associated sliding shoe occupies a slanting position with respect to the guide groove in the unloaded condition of the respective spring member.

Any play in the vertical direction of the guide groove is thus eliminated in that each sliding shoe is loaded about a transverse axis to a position in which each sliding shoe abuts against the respective wall of the guide groove, at least near the ends, on the upper side and the lower side. This condition exists if each sliding shoe is sufficiently long. The diagonal of each sliding shoe must at least be equal to the height of the guide groove, but preferably the length of the sliding shoes is equal to the height of the guide groove, because in that case there will be no risk of the sliding shoes getting wedged in the guide groove upon pivoting thereon.

It is advantageous when the respective sliding shoes and spring members cooperate in such a manner that the sliding shoe associated with a particular spring member extends obliquely, for example at an angle of a few degrees, such as 3°, with respect to the guide groove in the unloaded condition of the spring member.

In this manner, the spring members will be loaded by placing the sliding shoes into the guide groove, whereby the sliding shoes must be bent back to a more or less straight position, so that a spring load is effected. The shape of the sliding shoes can be selected such that when the sliding shoes are placed into the guide grooves under spring load, a desired area of the sliding shoes will abut against the guide groove.

Preferably, each spring member is made up of a leaf spring, which is twisted through an angle, preferably of at least approximately 90°, in a point located between its ends.

In this manner, a spring action in two directions can be obtained by using very simple means. It is very advantageous thereby that each spring member can be rigidly attached to the lower closing element via a snap connection at one end. As a result of this, the sliding shoes and the spring members can be mounted on the lower closing element very easily, while also the mounting of the lower closing element in the frame of the open roof construction is simple, because all the parts are fixedly connected to the lower closing element.

Other alternatives and further elaborations constitute the subject matter of further independent and dependent claims.

BRIEF DESCRIPTION OF THE DRAWINGS

The invention will be explained in more detail hereafter with reference to the drawings, which schematically show two embodiments of the invention.

DETAILED DESCRIPTION OF THE ILLUSTRATIVE EMBODIMENTS

In the figures associated with the various embodiments, similar parts are indicated by the same numerals, preceded by one hundred or a multiple thereof.

Figure 1:
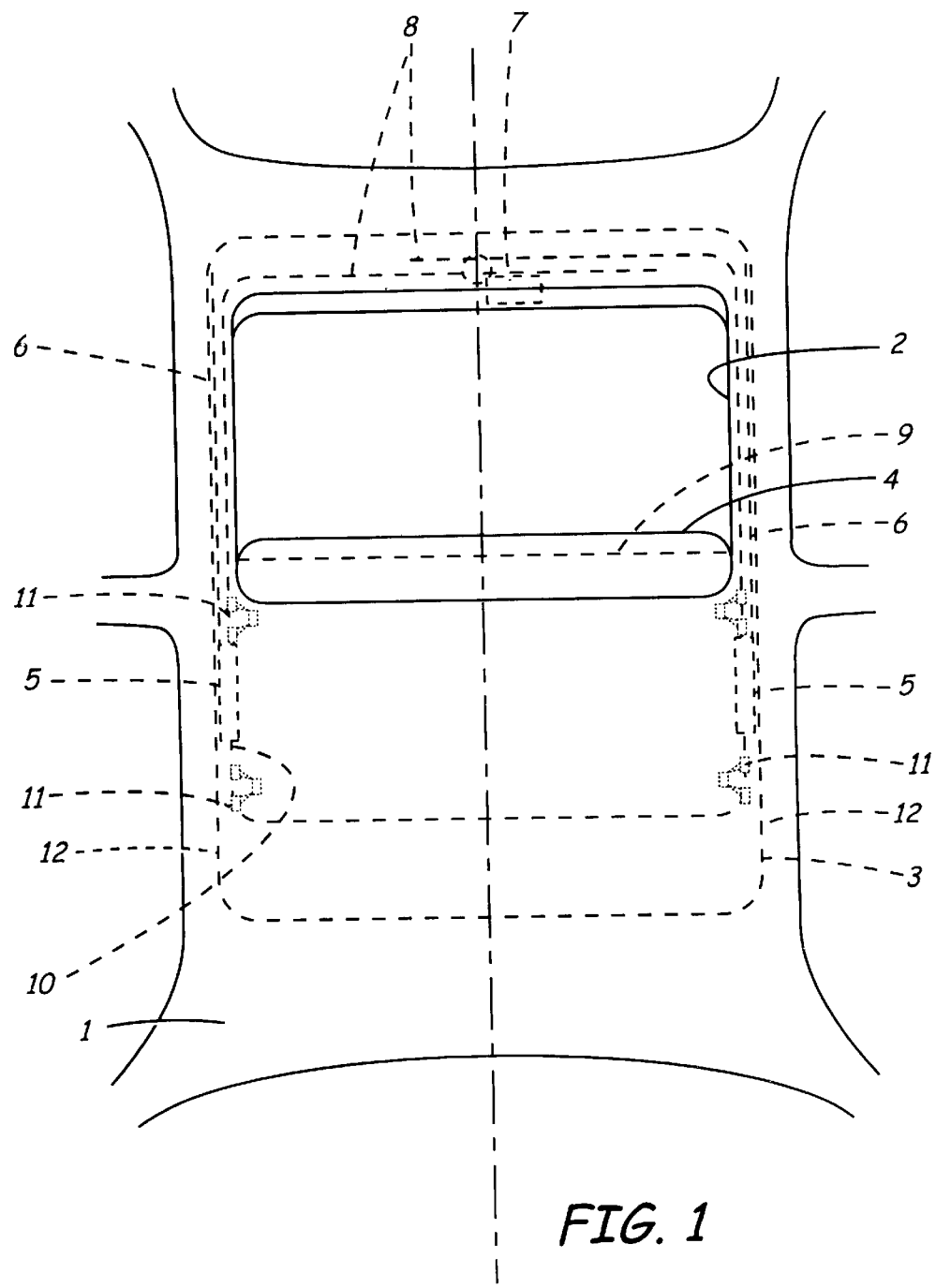
FIG. 1 is a highly schematic top plan view of a vehicle roof fitted with an embodiment of the open roof construction according to the invention.
Figure 2:
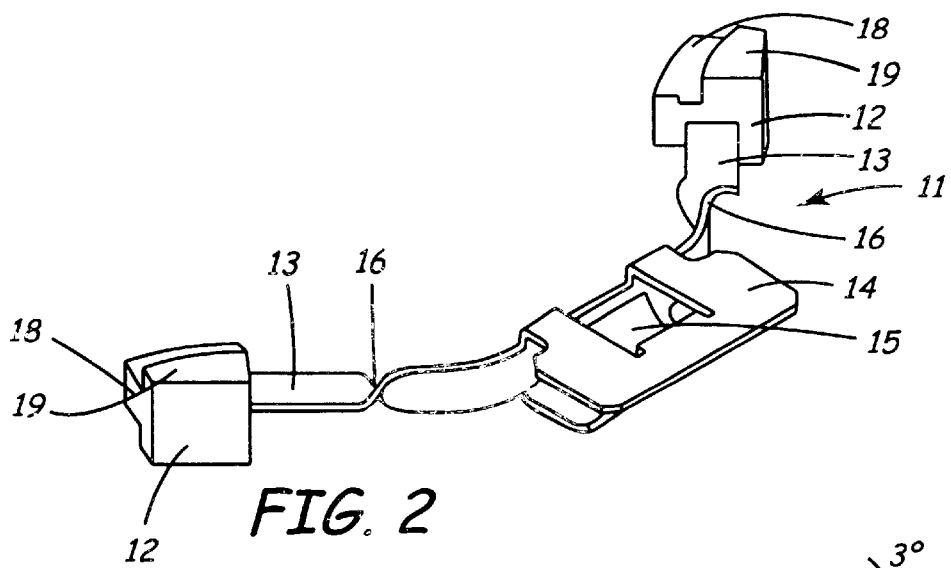
FIG. 2 is a larger-scale, perspective view of a unit of sliding shoes and spring members for a sun screen of the open roof construction of FIG. 1.

FIG. 1 shows the fixed roof 1 of a motor vehicle, in this case a passenger car. Said fixed roof 1 is provided with a substantially rectangular roof opening 2 for an open roof construction to be mounted therein. The open roof construction comprises a stationary frame 3, which in this case is mounted against the underside of fixed roof 1 of the vehicle.

In the illustrated embodiment, the open roof construction is a so-called sliding roof or a sliding-tilting roof, which comprises a more or less rigid (in this case), preferably transparent panel 4 as the upper closing element, which is capable of selectively closing roof opening 2 or releasing it to a greater or lesser degree. To this end, panel 4 is laterally supported by mechanisms 5, which are slidably accommodated in guide rails 6 mounted on frame 3 or forming part thereof, which rails extend in longitudinal direction on either side of roof opening 2 and rearwards thereof, in parallel relationship to each other. Said mechanisms 5 can be moved synchronously in guide rails 6, thus moving the panel not only in longitudinal direction but also in vertical direction. To this end, mechanisms 5 are operated from a driving device 7, such as an electric motor, for example via pull-push cables 8.

Besides panel 4, the open roof construction also comprises a lower closing element, which in the form illustrated is a sun screen 9, which is slidably guided in guide grooves 10 of guide rails 6 with its side edges. Sun screen 9 can be moved forward or backward manually or automatically, or be driven by panel 4.

Sun screen 9 is fitted with sliding shoe units 11, in this case consisting of two sliding shoe units 11 on each side edge of sun screen 9, for moving the sun screen 9 in said guide grooves 10.

FIGS. 2–7 show a sliding shoe unit 11 on a larger scale. As is shown in the figures, each sliding shoe unit 11 comprises two sliding shoes 12, which are each connected to a single mounting element 14 via an associated spring member 13. Said mounting element 14 has a U-shaped cross-section comprising two legs, whereby a snap nose 15 or projection is formed on the longer leg. Said two legs enable the mounting element 14 to engage horizontally round a sun screen 9, which is provided on at least one side with a recess in its flat surface, into which snap projection 15 can snap so as to lock the mounting element 14 in position with respect to sun screen 9.

Formed on both ends of the web of U-shaped mounting element 14 is one end of the spring member 13, in this case a leaf spring. Mounting element 14 and spring members 13 may be made in one piece of spring steel. Leaf spring 13 is twisted through an angle of at least approximately 90° in a transition point 16, approximately halfway the sliding shoe 12 and the mounting element 14, so that the leaf spring is capable of performing a horizontal spring function on one side of transition point 16 and a vertical spring function on the other side of transition point 16.

Formed on the horizontally extending free end of the leaf springs 13 is the respective sliding shoe 12. The sliding shoes 12 may be formed on the ends of spring members 13 by injection molding, whereby a hole 17 (FIG. 3) through leaf spring 13 provides a strong connection between sliding shoe 12 and leaf spring 13. As is shown in the various figures, each sliding shoe 12 is provided with a narrow portion 18, seen in vertical direction, on the side facing away from sun screen 9 and on the side facing towards guide groove 10, respectively. Said narrow portion 18 is intended for engagement in guide groove 10. The length of narrow portion 18 is greater than the height of said portion and of guide groove 10. The wide portion 19, seen in vertical direction, of sliding shoe 12 is wider than guide groove 10, and the surfaces of wide portion 19 that extend beyond narrow portion 18, seen in vertical direction, are intended for engagement with the vertical surfaces of the guide rails 6 which bound guide groove 10.

Figure 6:
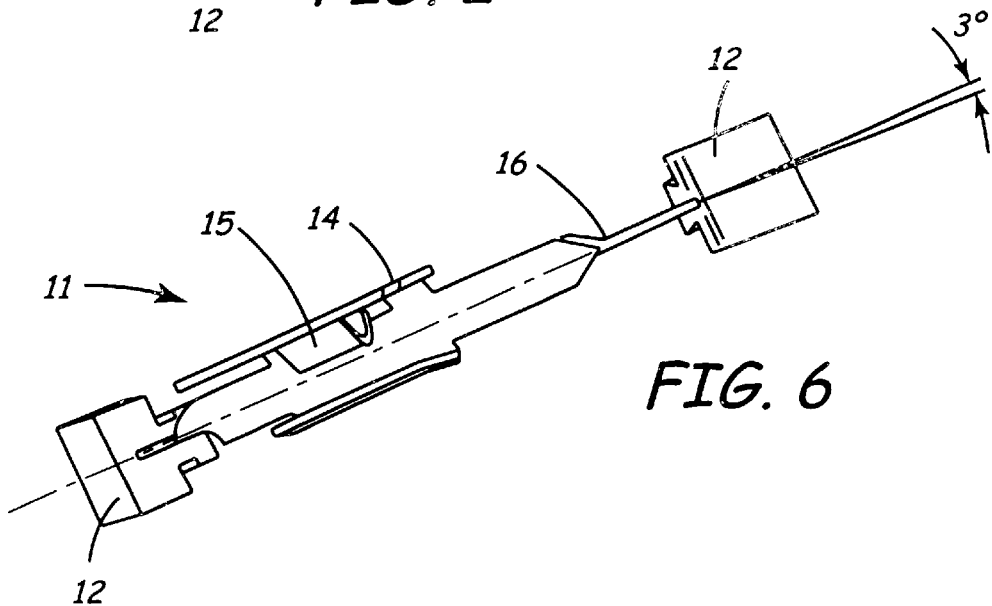
FIG. 6 is a view according to arrow VI in FIG. 3.

In particular FIG. 6 shows that the sliding shoes 12 are formed to extend at a small angle with respect to the associated part of leaf spring 13, in such a manner that the upper surface and the lower surface of both the narrow portion 18 and the wide portion 19 extend at a small angle of a few degrees, for example 30, with respect to the central axis of leaf spring 13, seen in the longitudinal direction of leaf spring 13. The sliding shoes 12 are molded or mounted slightly obliquely on the respective ends of leaf springs 13 to that end, whereby the end of each sliding shoe 12 facing towards the leaf spring is off-centre, while the central axis of each sliding shoe 12 and the central axis of the respective portion of the leaf spring 13 intersect at the end of sliding shoe 12 remote from leaf spring 13. As a result of this arrangement of sliding shoes 12 it seems as if they are slightly pivoted about a transverse axis of the open roof construction in the mounted position of the open roof construction.

Figure 8:
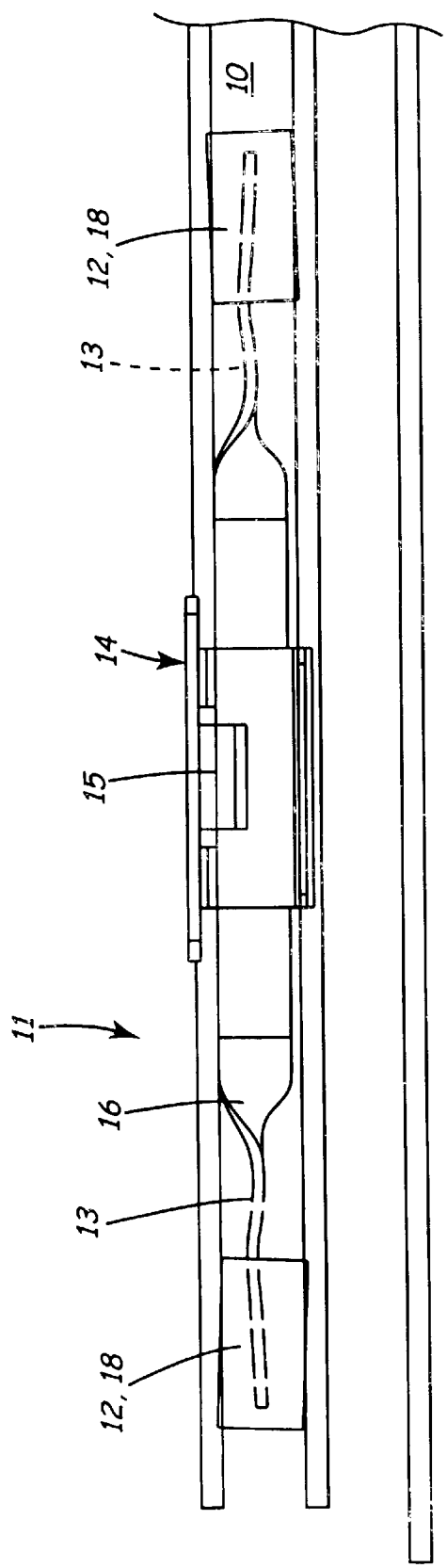
FIG. 8 is a highly schematic illustration of the mounting of the sliding shoes in a guide groove of the open roof construction.

FIG. 8 shows that, in order to make it possible to mount the sliding shoes 12 in guide grooves 10, said sliding shoes 12 must be pivoted about said transverse axis of the open roof construction, against the spring force of the horizontal portion of the leaf spring 13, in comparison with the unloaded position. As a result, sliding shoe 12 will be pressed against the upper side and the lower side of guide groove 10 with its upper surface and its lower surface, in particular of narrow portion 18, as a result of which any tolerances in the height of sliding shoe 12 and/or guide groove 10 are compensated and rattling in vertical direction is prevented. Since the leaf springs 13 press the sliding shoes against horizontal surfaces of guide grooves 10 in lateral direction as well, a rattle-free guidance of sliding shoes 12 in guide grooves 10 is ensured in that direction, too. The pressure forces furthermore provide an even and desired (frictional) braking action with respect to the sun screen, so that said sun screen will not move when longitudinal forces are being exerted thereon.

Figure 7:
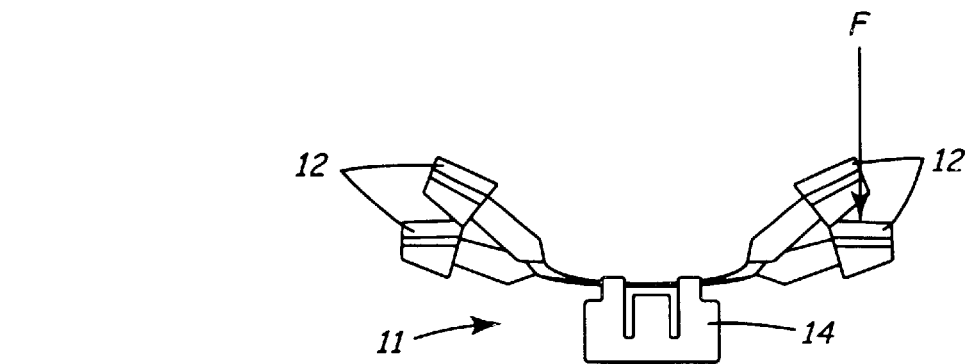
FIG. 7 is a plan view corresponding to FIG. 3 of the sliding shoe unit, showing the deformation of the spring members.
Figure 3:
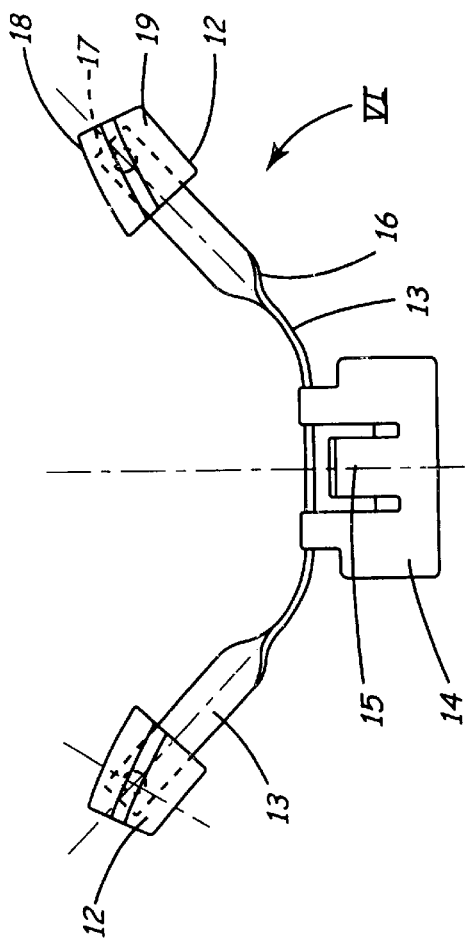
FIGS. 3, 4 and 5 are a plan view, a side view and a rear view, respectively, of the sliding shoe unit of FIG. 2.
Figure 5:
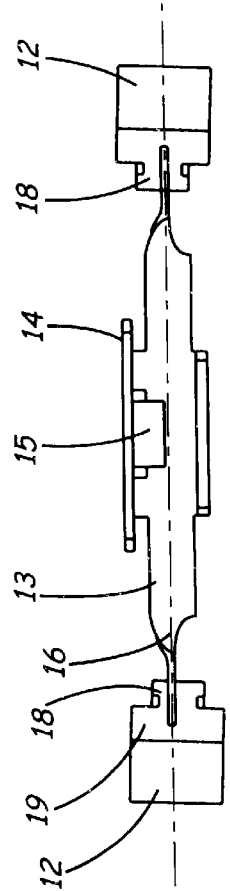
Figure 4:
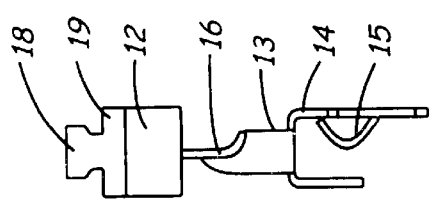

FIG. 7 shows another plan view of a sliding shoe unit 11 with the sliding shoes 12 and the associated leaf springs 13 in the unloaded position (normal lines) and in the loaded position of use (thin lines). The figure thereby shows that the sides remote from sun screen 9 of in particular the narrow portion 18 of the sliding shoes 12 are slightly twisted about a vertical axis, so that a correct abutment of the sliding shoes 12 against the vertical wall of guide groove 10 is effected, even when the positions of use vary slightly.

Figure 9:
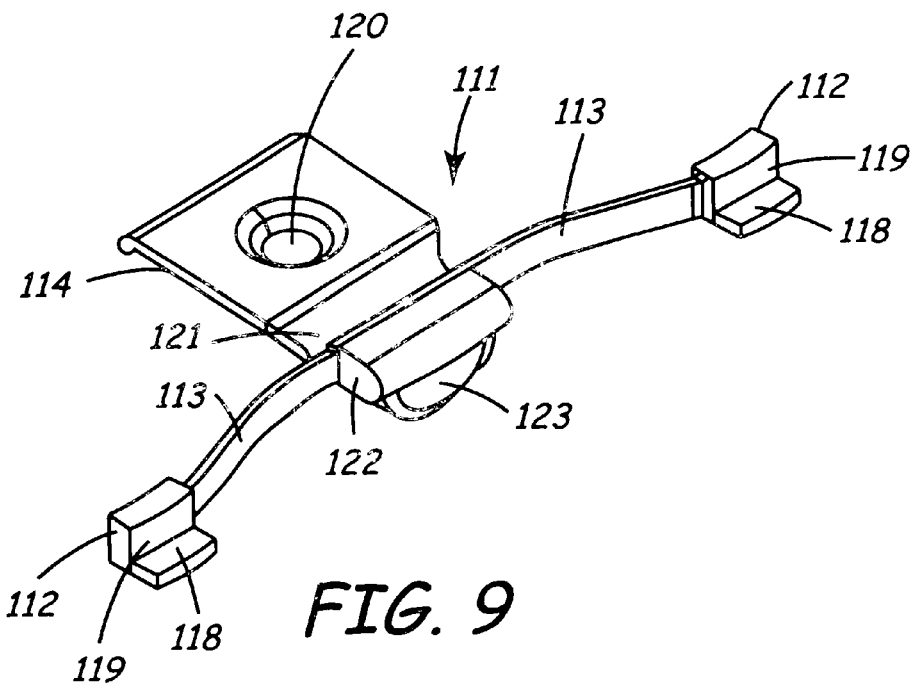
FIG. 9 is a perspective view of an alternative embodiment of the sliding shoe unit of FIG. 2.
Figure 10:
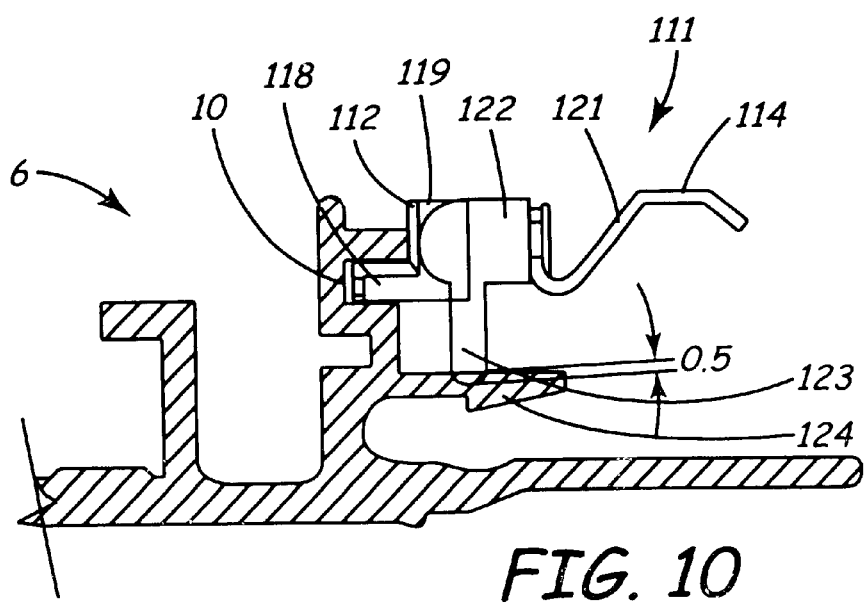
FIG. 10 is a cross-sectional view of a guide rail of an open roof construction, in which a sliding shoe unit according to FIG. 9 is present.

FIGS. 9 and 10 show a second embodiment of a sliding shoe unit 111 comprising two sliding shoes 112, which are each connected to a mounting element 114 by means of a spring member 113. The sliding shoes 112 are positioned symmetrically on either side of mounting element 114, and spring members 113 are flat, non-twisted leaf springs in this embodiment, which allow springing movement in a horizontal plane. The spring members 113 are slightly deflected. Also in this embodiment the sliding shoes 112 comprise a narrow portion 118 and a wide portion 119, wherein the narrow portion 118 has convex upper and lower surfaces, while also the front surface is convex in two directions. Narrow portion 118 exhibits some play in vertical direction with respect to the guide groove into which it is to be placed. The surface of the wide portion 119 that faces towards the guide rail 6 during mounting is convex about the vertical line of curvature.

In this embodiment, mounting element 114 is provided with a hole 120 for the screwed connection of mounting element to sun screen 9. Mounting element 114 comprises a spring portion 121, so that the portion 122 to which the spring members 113 are attached can move in vertical direction with respect to sun screen 9. This part 122 remote from sun screen 9 comprises a downward projection 123 on the underside, whose length dimension is such that it will engage with a horizontal flange 124 of guide rail 6 when the sliding shoes 112 are being mounted in the respective guide groove 10 of guide rail 6. As a result, mounting element 114 will be moved slightly upwards (for example in the order of 0.5 mm) with respect to the sliding shoes 112, as a result of which sliding shoes 112 will be loaded in upward direction via the spring members 113, causing the sliding shoes 112 to be positioned firmly in guide groove 10. The tendency to rattle will be suppressed. Due to the presence of some play between narrow portions 118 and guide groove 10 and the concave shape of the sliding surfaces, a proper abutment of the sliding surfaces against the associated surfaces of guide groove 10 will nevertheless be effected in various angular positions of the sliding shoes 112 at all times, so that an even frictional resistance is obtained.

Figure 11:
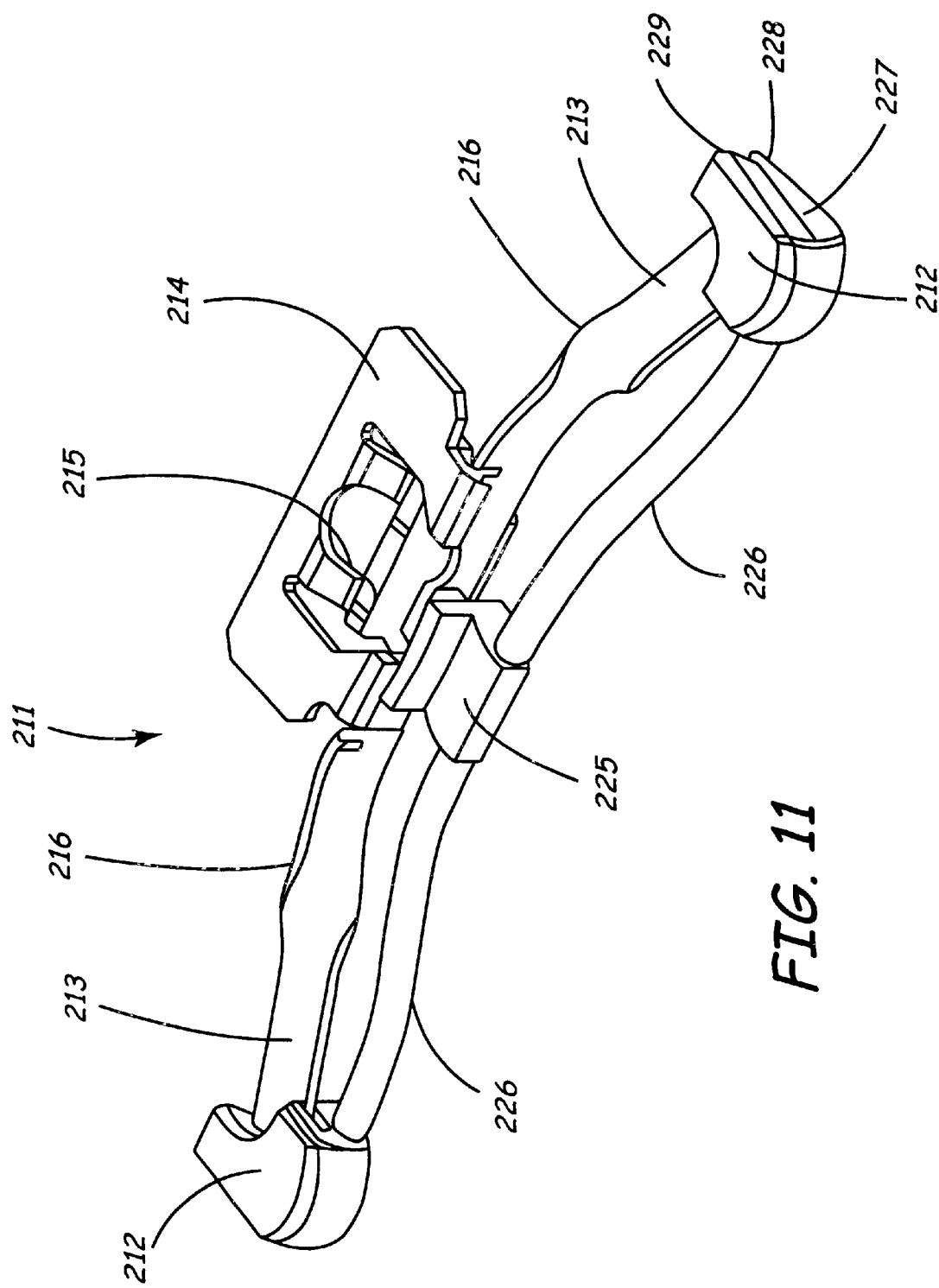
FIG. 11 is a perspective view of a second alternative embodiment of the sliding shoe unit of FIG. 2.
Figure 12:
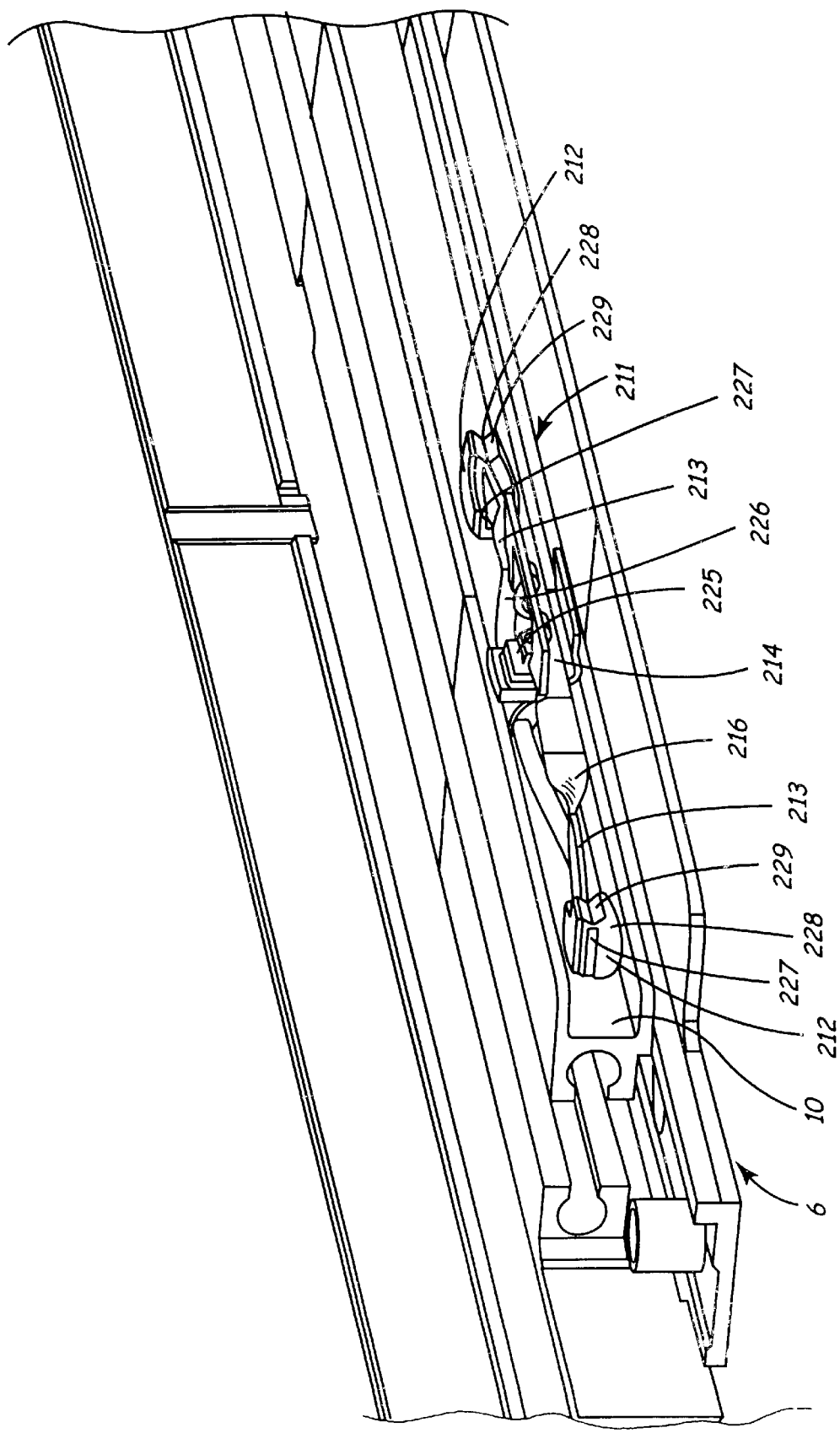
FIG. 12 is a perspective view of one of the guide rails, seen from the roof opening, in which a loose sliding shoe unit according to FIG. 11 is present.

FIGS. 11 and 12 show another embodiment of the sliding shoe unit according to the invention, which is indicated at 211 in this case. Said sliding shoe unit 211 comprises elements of the preceding two embodiments. The sliding shoe unit 211 comprises two sliding shoes 212 and two spring elements 213, which are formed on a mounting element 214. Also in this embodiment, the spring members 213 are leaf springs comprising a transition point 216 which is twisted through 90°, so that the leaf spring 213 is capable of performing a horizontal spring function on one side of transition point 216 and a vertical spring function on the other side of transition point 216.

A vertical load on sliding shoes 212, in upward direction in this case, is effected by means of an auxiliary sliding shoe 225 which is formed on mounting element 214, symmetrically between the two sliding shoes 212. Said auxiliary sliding shoe 225 is arranged for engagement in guide groove 10 of guide rails 6 of the open roof construction, wherein auxiliary sliding shoe 225 is positioned at a higher level than sliding shoes 212 in the unmounted condition of sliding shoe unit 211, so that spring members 213 must be bent upwards to enable insertion of sliding shoes 212 and of auxiliary sliding shoes 225 into the same guide groove 10. In this manner, the sliding shoes 212 as well as the auxiliary sliding shoe 225 are pressed against the lower side and the upper side, respectively, of the respective guide groove 10, so that rattling of the sliding shoes 212 is not possible any more.

In order to enable proper engagement with the lower wall and the vertical wall of the guide groove 10 at various angles, the underside of sliding shoes 212 and the side remote from sun screen 9 are convex, preferably in two directions. The same applies to the upper side of auxiliary sliding shoe 225, while said auxiliary sliding shoe 225 is furthermore provided with an upright, curved wall, which is capable of engaging the edge of the guide groove 10.

An important difference with the two preceding embodiments of the sliding shoe unit is that the sliding shoes are not fixedly attached to the associated spring member 213 in this embodiment, and that the spring members 213 only function to load the sliding shoes 212, while the connecting function is performed by separate connecting elements 226. In this embodiment, said connecting elements 226 consist of flexible yet sufficiently pressure-rigid, bar-shaped members between sliding shoes 212 and auxiliary sliding shoe 225. These different parts are formed in one piece of plastic material in this embodiment. The sliding shoes 212 are each provided with a horizontal groove 227, which is open towards sun screen 9 and which continues over the entire length of the respective sliding shoe 12, the height thereof being such that the end of the associated spring member 213 can be inserted therein so as to be freely movable therein.

In order to prevent the end of spring members 213 from unintentionally moving out of the associated groove 227 (for example during mounting), the groove 227 is provided on the entry side with a snap edge or locking edge 228 on the upper side or the lower side thereof, so that the height of the groove is zero at that location. Sloping entry edges 229 ensure that the ends of spring members 213 can easily press the locking edges 228 apart to enable entry into groove 227, while the straight edges on the inner side of locking edges 228 can prevent the spring ends from moving out.

As is shown in FIG. 12, connecting elements 226 will extend substantially in the longitudinal direction of guide rails 6 or in the direction of movement of sliding shoes 212 in the mounted position of sun screen 9 with the sliding shoe units 212 provided thereon. As a result of this arrangement, forces being exerted on sun screen 9 and/or on sliding shoes 212 in the longitudinal direction of guide rails 6 will be transmitted by the connecting elements 226, which are sufficiently pressure-rigid, whilst forces being 25 exerted in vertical direction and in lateral direction will be taken up by the spring members 213, since the flexural strength of the spring members 213 is considerably greater than that of the connecting elements 226.

Upon lateral movement of sun screen 9 and the consequent compression of sliding shoes 212 with respect to sun screen 9, the ends of spring members 213 can slide freely in grooves 227 of the associated sliding shoes 212, and the sliding shoes are at least approximately kept in position, seen in longitudinal direction, by connecting elements 226. Slanting of sun screen 9 will not lead to extra friction of the leading sliding shoe 212 against guide rails 6 at the location of said leading sliding shoe, so that said slanting is not additionally increased and sun screen 9 can be moved evenly, therefore, without excessive variations in the required sliding force on sun screen 9. Any unevennesses in the guide grooves 10 of guide rails 6 will hardly induce the sun screen to slant, if at all.

From the foregoing it will be apparent that the invention provides an open roof construction for a vehicle which excels by a simple mounting of the sliding shoes on the sun screen and of the sun screen in the guide rails, a rattle-free suspension of the sun screen and an even braking action on the sun screen.

The invention is not restricted to the above-described embodiment as shown in the drawing, which can be varied in several ways without departing from the scope of the invention. Thus, the invention can also be used with sliding shoes of closing elements other than sun screens, such as cover screens or insulation screens, or independent closing elements, such as louvres or the like, which are used without upper closing elements. The sliding shoes could also be pivotally guided, by means of a pin, about a transverse axis with respect to the closing element.

What is claimed is:

1. An open roof construction for a vehicle having an opening in its fixed roof, said open roof construction comprising:
    a stationary part to be secured to the roof having parallel guide grooves facing each other; and
    a closing element supported by said stationary part, which is slidably guided at its side edges in the guide grooves by two sliding shoes which are biased outwardly with respect to the closing element by spring members, wherein the two sliding shoes are connected to the closing element with the spring members that support each of the sliding shoes away from the closing element on both sides of a fixing point to said closing element, and wherein means are provided by which said spring members are symmetrically loaded in a vertical direction with respect to said fixing point.

2. The open roof construction according to claim 1, wherein said spring members are arranged such that the sliding shoes are capable of pivoting movement against the spring force of the spring members about a transverse axis of the open roof construction.

3. The open roof construction according to claim 2, wherein each spring member is made up of a leaf spring, which is twisted through an angle of at least approximately 90° in a point located between ends of each spring member.

4. The open roof construction according to claim 1, wherein said means comprise an element provided between the sliding shoes proximate the fixing point.

5. The open roof construction according to claim 4, wherein the two sliding shoes are combined with one mounting element to form one unit, and wherein the mounting element is fixed to the closing element, and wherein the element for loading the spring members comprises an auxiliary sliding shoe, which is formed on the mounting element, on a side remote from the closing element where the spring members abut, and which is capable of engaging in the associated guide groove, and wherein the sliding shoes are movable in the vertical direction with respect to said auxiliary sliding shoe.

6. The open roof construction according to claim 5, wherein said sliding shoes are connected to said auxiliary sliding shoe via a flexible connecting element, and wherein said spring members slidably engage said sliding shoes, at least in a longitudinal direction of the guide grooves, and wherein said connecting element is pressure-rigid in the longitudinal direction of the guide grooves and at least substantially extends in the longitudinal direction in the mounted position of the closing element.

7. The open roof construction according to claim 6, wherein said sliding shoes, said auxiliary sliding shoe and said connecting elements are integrally formed on the mounting element, and wherein said mounting element and said spring members are formed from a piece of spring steel.

8. The open roof construction according to claim 6, wherein said spring members each engage with their flat ends in a groove in the associated sliding shoe, which groove extends in a longitudinal direction of the guide groove and which can open in a direction toward the closing element.

9. The open roof construction according to claim 1, wherein each spring member can be rigidly attached to the closing element via a snap connection at one end.

10. The open roof construction according to claim 9, wherein said snap connection is formed on one leg of a U-shaped mounting element, which has been slid and snapped over the side edge of the lower closing element.

11. The open roof construction according to claim 1, wherein said sliding shoes are rounded to a convex shape in two directions, on at least one of their upper side, their lower side and the side remote from the closing element.

12. An open roof construction for a vehicle having an opening in its fixed roof, said open roof construction comprising:
    a stationary part to be secured to the roof having parallel guide grooves facing each other;
    an adjustable upper closing element supported by said stationary part, which is adjustable between a closed position, in which it closes the roof opening, and an open position, in which it releases the roof opening at least partially;
    a lower closing element slidably guided at its side edges in the guide grooves by sliding shoes which are biased outwardly with respect to the lower closing element by spring members, wherein said sliding shoes are capable of pivoting movement against the spring force of the spring members about a transverse axis of the open roof construction, and wherein the length of the sliding shoes is at least equal to the height of the guide grooves.

13. The open roof construction according to claim 12, wherein each sliding shoe and spring member cooperate such that the associated sliding shoe occupies a slanting position with respect to the guide groove in the unloaded condition of the spring member.

14. An open roof construction for a vehicle having an opening in its fixed roof, said open roof construction comprising:
    a stationary part to be secured to the roof having parallel guide grooves facing each other;
    an adjustable upper closing element supported by said stationary part, which is adjustable between a closed position, in which it closes the roof opening, and an open position, in which it releases the roof opening on the front side;
    a lower closing element slidably guided at its side edges in the guide grooves by two sliding shoes, which are biased outwardly with respect to the lower closing element by spring members, wherein the two sliding shoes are connected to the lower closing element on both sides of a fixing point to said lower closing element, being loaded by an associated spring member, and wherein an element is provided at said fixing point by which said spring members are loaded in a vertical direction.

15. An open roof construction for a vehicle having an opening in its fixed roof, said open roof construction comprising:

a stationary part to be secured to the roof having parallel guide grooves facing each other;

an adjustable upper closing element supported by said stationary part, which is adjustable between a closed position, in which it closes the roof opening, and an open position, in which it releases the roof opening on the front side; and a lower closing element slidably guided at its side edges in the guide grooves by spaced-apart sliding shoes, which are biased outwardly with respect to the lower closing element by separate spring members, wherein each spring member comprises a leaf spring, which springs at least in directions parallel and perpendicular to a major surface of the lower closing element.

16. An open roof construction according to claim 15, wherein each spring member is rigidly attached to the lower closing element via a snap connection at one end and fitted with the associated sliding shoe at the other end.

17. An open roof construction for a vehicle having an opening in its fixed roof, said open roof construction comprising:

a stationary part to be secured to the roof having parallel guide grooves facing each other;

an adjustable upper closing element supported by said stationary part, which is adjustable between a closed position, in which it closes the roof opening, and an open position, in which it releases the roof opening on the front side; and a lower closing element slidably guided at its side edges in the guide grooves by sliding shoes, which are biased outwardly with respect to the lower closing element by spring members, wherein the sliding shoes are combined with one mounting element to form one unit, and wherein said sliding shoes are connected to the mounting element via said spring members, and wherein the mounting element is fixed to the lower closing element, and wherein said mounting element is formed with a projection on a side remote from the lower closing element, against which the spring members abut, which projection is capable of engaging the stationary part, as a result of which it is movable in vertical direction with respect to the sliding shoes, and wherein said sliding shoes engage in said guide grooves with some play.

18. An open roof construction for a vehicle having an opening in its fixed roof, said open roof construction comprising:

a stationary part to be secured to the roof having parallel guide grooves facing each other;

a closing element supported by said stationary part, which is slidably guided at its side edges in the guide grooves by two sliding shoes which are biased outwardly with respect to the lower closing element by spring members, and wherein the two sliding shoes are connected to the lower closing element, via a flexible connecting element on both sides of a fixing point to said lower closing element, and wherein said connecting element is pressure-rigid and at least substantially extends in a longitudinal direction in the mounted position of the closing element, and wherein said spring members engage said sliding shoes slidably at least in a longitudinal direction.

19. An open roof construction according to claim 18, wherein each of said spring members are insertable into the associated sliding shoes via a self-closing opening.

* * * * *